US012248256B2

(12) United States Patent
Kano

(10) Patent No.: US 12,248,256 B2
(45) Date of Patent: Mar. 11, 2025

(54) CHARGING MEMBER, METHOD FOR PRODUCING CHARGING MEMBER, CHARGING DEVICE, PROCESS CARTRIDGE, AND IMAGE FORMING APPARATUS

(71) Applicant: FUJIFILM Business Innovation Corp., Tokyo (JP)

(72) Inventor: Fuyuki Kano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/512,878

(22) Filed: Nov. 17, 2023

(65) Prior Publication Data

US 2024/0427259 A1 Dec. 26, 2024

(30) Foreign Application Priority Data

Jun. 20, 2023 (JP) ................................ 2023-101256

(51) Int. Cl.
*G03G 15/02* (2006.01)

(52) U.S. Cl.
CPC ..... *G03G 15/0233* (2013.01); *G03G 15/0216* (2013.01)

(58) Field of Classification Search
CPC .................... G03G 15/0233; G03G 2215/025
USPC ................................................ 399/174, 176
See application file for complete search history.

(56) References Cited

U.S. PATENT DOCUMENTS

2012/0082475 A1* 4/2012 Kawai ................ G03G 15/0225
399/176
2017/0277060 A1* 9/2017 Kamijo .............. G03G 15/0233
2021/0103228 A1 4/2021 Morioka
2023/0202150 A1 6/2023 Kuroda et al.

FOREIGN PATENT DOCUMENTS

JP 2003-202732 A 7/2003
JP 2003-202733 A 7/2003
JP 2010049172 A * 3/2010
JP 5361348 B2 * 12/2013
JP 2022-003370 A 1/2022

OTHER PUBLICATIONS

May 3, 2024 Extended European Search Report issued in European Patent Application No. 23210431.5.

* cited by examiner

*Primary Examiner* — Robert B Beatty
(74) *Attorney, Agent, or Firm* — Oliff PLC

(57) ABSTRACT

A charging member includes a support member, an elastic layer provided on the support member, an outer layer provided on the elastic layer, and a protective layer provided as an outermost layer on the outer layer. The protective layer contains silica and has a silicon element concentration of 10 atomic % or more, and the outer peripheral surface has a contact angle with water of 35 degrees or less.

12 Claims, 4 Drawing Sheets

CHARGING MEMBER, METHOD FOR PRODUCING CHARGING MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2023-101256 filed Jun. 20, 2023.

BACKGROUND

(i) Technical Field

The present disclosure relates to a charging member, a method for producing a charging member, a charging device, a process cartridge, and an image forming apparatus.

(ii) Related Art

Japanese Unexamined Patent Application Publication No. 2003-202733 discloses a charging member including a surface layer containing a silicone resin which contains a silicon atom bonded to a compound having a hydrophilic group, the surface of the charging member having a contact angle with water of 25 degrees or less.

Japanese Unexamined Patent Application Publication No. 2022-003370 discloses a charging member including a conductive support and a conductive body, the conductive body including an elastic layer, a resin layer, and a coating layer which forms an uppermost surface. The coating layer contains a polysiloxane compound having a Si—O—Zr bond in its molecular structure.

SUMMARY

Aspects of non-limiting embodiments of the present disclosure relate to a charging member causing little contamination of the surface and little occurrence of a crack in an outer layer even when used for a long period of time as compared with a charging member including a protective layer, having a silicon element concentration of less than 10 atomic %, and an outer peripheral surface having a contact angle with water of over 35 degrees.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a charging member including a support member, an elastic layer provided on the support member, an outer layer provided on the elastic layer, and a protective layer provided as an outermost layer on the outer layer, in which the protective layer contains silica and has a silicon element concentration of 10 atomic % or more, and the outer peripheral surface has a contact angle with water of 35 degrees or less.

BRIEF DESCRIPTION OF THE DRAWINGS

Exemplary embodiments of the present disclosure will be described in detail based on the following figures, wherein.

DETAILED DESCRIPTION

Figure 1:
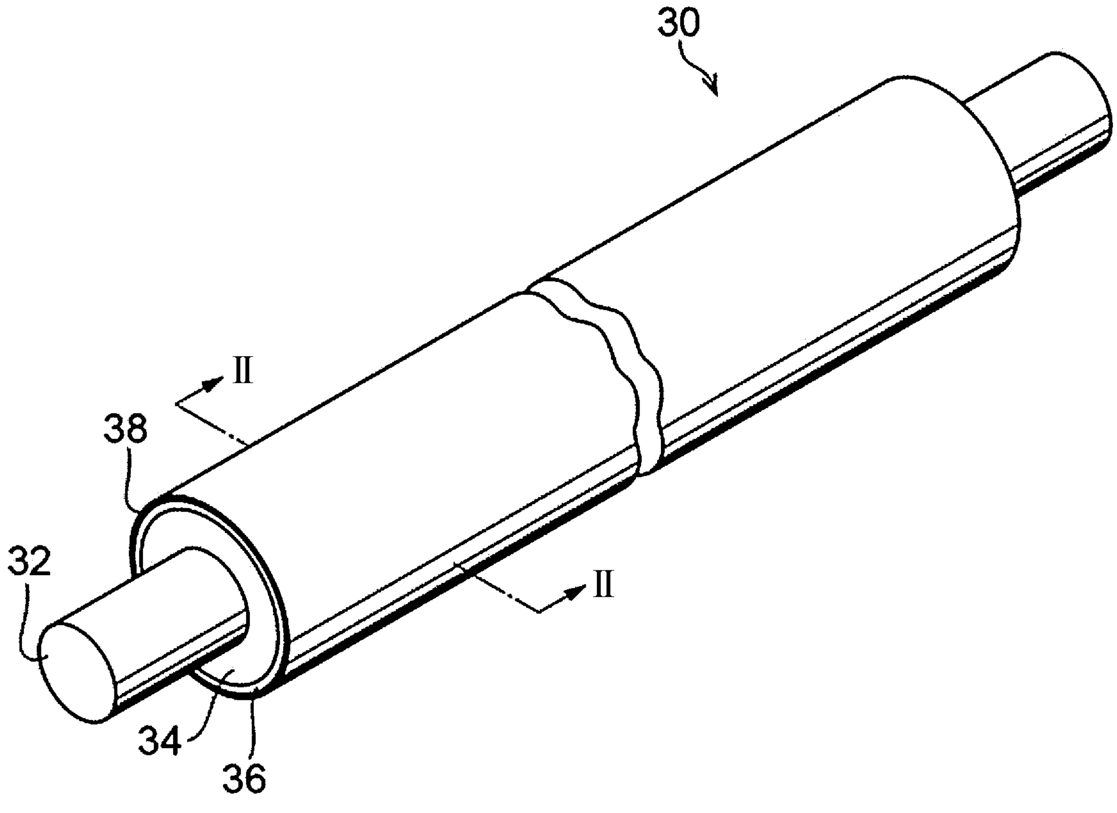
FIG. 1 is a schematic perspective view showing an example of a charging member according to an exemplary embodiment of the present disclosure.

An exemplary embodiment of the present disclosure is described below. The description and examples illustrate the exemplary embodiment and does not limit the scope of the exemplary embodiment.

In the present disclosure, a numerical range shown by using "to" represents a range including the numerical values described in front and behind "to" as the minimum value and the maximum value, respectively.

In the numerical ranges stepwisely described in the present disclosure, the upper limit value or the lower limit value described in one of the numerical ranges may be replaced by the upper limit value or the lower limit value in another numerical range stepwisely described. In addition, in a numerical range described in the present disclosure, the upper limit value or the lower limit value of the numerical range may be replaced by the value described in an example.

In the present disclosure, the term "process" includes not only an independent process but also even a process which cannot be distinguished from another process when the object of the process is achieved.

In the present disclosure, when an exemplary embodiment is described with reference to the drawings, the configuration of the exemplary embodiment is not limited to the configuration shown in the drawings. In addition, the size of a member in each of the drawings is conceptual, and the relative relation between the sizes of members is not limited to each of the drawings.

In the present disclosure, each component may contain plural materials corresponding to the component. In the present disclosure, in description of the amount of each of the components in a composition, when plural materials corresponding to each of the components are present in the composition, the amount of each of the components represents the total amount of the plural materials present in the composition unless otherwise specified.

In the present disclosure, plural types of particles corresponding to each component may be contained. When plural types of particles corresponding to each of the components are present in the composition, the particle diameter of each of the components represents the value of a mixture of the plural types of particles present in the composition unless otherwise specified.

In the present disclosure, the "axial direction" of a charging member represents the direction in which the rotational axis of the charging member extends, and the "circumferential direction" of the charging member represents the rotational direction of the charging member.

<Charging Member>

A charging member according to an exemplary embodiment of the present disclosure includes a support member, an elastic layer provided on the support member, an outer layer provided on the elastic layer, and a protective layer provided as an outermost layer on the outer layer.

Figure 2:
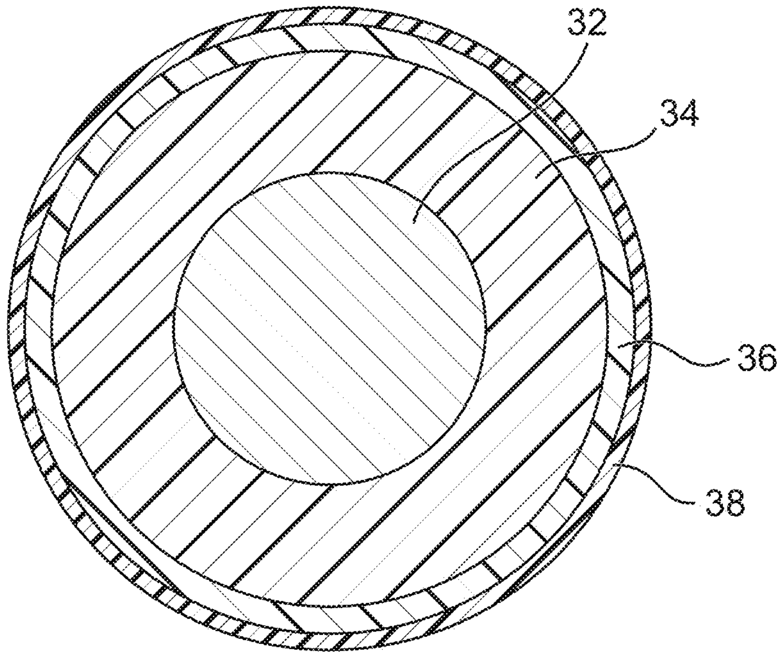
FIG. 2 is a schematic sectional view, which is a II-II sectional view of FIG. 1, showing an example of a charging member according to an exemplary embodiment of the present disclosure.

FIG. 1 is a schematic perspective view showing an example of a charging member according to an exemplary embodiment of the present disclosure. FIG. 2 is a II-II sectional view of FIG. 1 which is a sectional view taken along the radial direction of a charging member shown in FIG. 1.

A charging member 30 shown in FIG. 1 is a roller-shaped charging member. The charging member 30 has a structure in which an elastic layer 34, an outer layer 36, and a protective layer 38 are laminated in this order on a support member 32. The charging member 30 may have an adhesive layer (not shown) between the support member 32 and the elastic layer 34.

The shape of the charging member according to the exemplary embodiment is not limited to a roller shape, and may be a shape such as a belt shape, a tube shape, a blade shape, or the like.

In the charging member according to the exemplary embodiment, the protective layer contains silica (silicon dioxide, $SiO_2$) and has a silicon element concentration of 10 atomic % or more, and the outer peripheral surface has a contact angle with water of 35 degrees or less.

The charging member according to the exemplary embodiment causing little contamination of the surface and little occurrence of a crack in the outer layer even when used for a long period of time. The reason for this is supposed as follows.

When an image is formed for a long period of time, contamination is gradually accumulated on the surface of the charging member. The contamination is mainly derived from a toner and contains the component of toner base particles and the component of a toner external additive. The contamination of the surface of the charging member easily occurs on a charging member of a system in contact with the surface of a photoreceptor, and contamination may occur on a charging member of a system not in contact with the surface of a photoreceptor because the toner is electrostatically adsorbed.

The surface contamination of the charging member causes an increase in electrical resistance of the contamination region and thus decreases the charging uniformity of the charging member. This may result in the occurrence of image defects such as the occurrence of image density unevenness, an unintended streaky image, etc. Further, when the charging member comes in contact with another member (for example, a photoreceptor or a cleaning member of the charging member), a crack may occur in the outer layer of the charging member from a contamination-attached portion as a starting point because stress is concentrated in the contamination-attached portion of the surface of the charging member.

The charging member according to the exemplary embodiment includes the protective layer containing silica, and the protective layer has a silicon element concentration of 10 atomic % or more and thus suppresses deterioration in the resin of the outer layer caused by discharge and suppresses the occurrence of cracks in the outer layer.

Further, it is supposed that the charging member according to the exemplary embodiment has the outer peripheral surface having a contact angle with water of 35 degrees or less, that is, hydrophilic groups (for example, hydroxyl groups) are arranged so as to cover the outer peripheral surface, and thus the attachment of contamination can be suppressed, and charging uniformity can be maintained.

In the charging member according to the exemplary embodiment, from the viewpoint of suppressing the accumulation of contamination composed of toner as a principal component and the viewpoint of suppressing deterioration of the resin of the outer layer caused by discharge, the protecting layer preferably has a silicon element concentration of 10 atomic % or more, preferably 15 atomic % or more, and more preferably 20 atomic % or more.

In the charging member according to the exemplary embodiment, the protecting layer may have a silicon element concentration of 33 atomic % or less, 30 atomic % or less, or 25 atomic % or less.

In the charging member according to the exemplary embodiment, from the viewpoint of suppressing the attachment of contamination, the outer peripheral surface preferably has a contact angle with water of 35 degrees or less, preferably 30 degrees or less, and more preferably 25 degrees or less. From the viewpoint of suppressing the attachment of contamination, the outer peripheral surface more preferably has a lower contact angle with water.

In the charging member according to the exemplary embodiment, the outer peripheral surface may have a contact angle with water of 0 degrees or more, 10 degrees or more, or 15 degrees or more.

The silicon element concentration in the protective layer of the charging member is determined by analyzing the element composition of the protective layer using SEM-EDX (Scanning Electron Microscopy with Energy Dispersive X-ray Spectroscopy). The specific analysis method is as described below.

The protective layer is separated from the support member at a center in the axial direction of the charging member, preparing a sample. When only the protective layer is difficult to peel, the outer layer and the protective layer are peeled, preparing a sample. The thickness of the protecting layer is measured, and the detection depth of SEM-EDX is adjusted so that the protective layer becomes an analysis object.

The sample is photographed at a magnification of 150 times using SEM (Hitachi S-4800) provided with an EDX apparatus (Horiba Ltd. EMAX ENERGY, detector: X-Max 80 $mm^2$). The acceleration voltage of SEM is 20 kV. Three rectangular fields of view of 0.8 mm in the axial direction× 1.4 mm in the circumferential direction are photographed. The all elements detected are quantitatively determined, and the ratio (atomic %) of silicon element in the protective layer is determined.

The contact angle with water of the outer peripheral surface of the charging member is measured as described below.

The temperature and humidity of the charging member are controlled by being placed for 24 hours in an environment at a temperature of 22° C. and a relative humidity of 55%.

In an environment at a temperature of 22° C. and a relative humidity of 55%, the axial direction of the charging member is fixed in the horizontal direction, and droplets of 1.0 μL of ion exchange water are dropped on the top at a center in the axial direction of the charging member. The contact angle 10 seconds after dropping is measured by a drop method. The water dropping and measurement of the contact angle are performed by using an automatic contact angle measuring instrument (Kyowa Interface Science Co., Ltd., CA-X). The measurement is performed at 4 positions at intervals of 90° in the circumferential direction of the charging member, and the four measurement values are arithmetically averaged.

Each of the layers of the charging member is described in detail below.

[Support Member]

The support member is a conductive member functioning as an electrode and a support of the charging member. The support member may be a hollow member or a nonhollow member, and is, for example, a rod-shape, cylindrical, or endless belt-shape member.

Examples of the support member include members of metals such as iron (free cutting steel), copper, a copper alloy, brass, stainless steel, aluminum, nickel, and the like; a member of iron plated with chromium, nickel, or the like; a resin-made or ceramic-made member having a plated outer peripheral surface; a resin-made or ceramic-made member containing a conductive agent; and the like.

[Elastic Layer]

The elastic layer preferably has conductivity and a volume resistivity of $1\times10^{3}$ Ωcm or more and $1\times10^{14}$ Ωcm or less at a temperature of 20° C.

The volume resistivity of the elastic layer is a value measured by the following method.

A sheet-shaped measurement sample is collected from the elastic layer, and a voltage adjusted so that an electric field (applied voltage/composition sheet thickness) is 1000 V/cm is applied for 30 seconds to the measurement sample by using a measurement jig (R12702A/B Resistivity Chamber; manufactured by Advantest Corporation) and a high resistance measurement device (R8340A digital high resistance/microcurrent meter; manufactured by Advantest Corporation) according to JIS K 6911 (1995). A current value is read and the volume resistivity is calculated by a formula below.

Volume resistivity (Ωcm)=(19.63×applied voltage (V)/(current value (A)×measurement sample thickness (cm))

The elastic layer may be a foamed elastic layer or a non-foamed elastic layer. The elastic layer may be disposed directly on the outer peripheral surface of the support member or may be disposed on the outer peripheral surface of the support member through an adhesive layer.

In an exemplary embodiment, the elastic layer contains an elastic material, a conductive agent, and other additives.

Examples of the elastic material include elastic materials such as polyurethane, nitrile rubber, isoprene rubber, butadiene rubber, ethylene-propylene rubber, ethylene-propylene-diene rubber, epichlorohydrin rubber, epichlorohydrin-ethylene oxide rubber, epichlorohydrin-ethylene oxide-allyl glycidyl ether rubber, styrene-butadiene rubber, acrylonitrile-butadiene rubber, butadiene rubber, chloroprene rubber, chlorinated polyisoprene, hydrogenated polybutadiene, butyl rubber, silicone rubber, fluororubber, natural rubber, and a mixture of two or more of these materials. Among these elastic materials, polyurethane, silicone rubber, ethylene-propylene-diene rubber, epichlorohydrin-ethylene oxide rubber, epichlorohydrin-ethylene oxide-allyl glycidyl ether rubber, acrylonitrile-butadiene rubber, and a mixture of two or more of these materials are preferred.

Examples of the conductive agent include an electron conductive agent and an ion conductive agent. Examples of the electron conductive agent include powders of carbon black such as furnace black, thermal black, channel black, Ketjen black, acetylene black, and the like; pyrolysis carbon; graphite; metals or alloys such as aluminum, copper, nickel, stainless steel, and the like; metal oxides such as tin oxide, indium oxide, titanium oxide, tin oxide-antimony oxide solid solution, tin oxide-indium oxide solid solution, and the like; a material produced by conductive treatment of the surface of an insulting material; and the like. Examples of the ion conductive agent include perchlorates or chlorates of tetraethyl ammonium, lauryltrimethylammonium, benzyltrialkylammonium, and the like; perchlorates or chlorates of alkali metals or alkaline earth metals such as lithium, magnesium and the like; and the like. The conductive agents may be used alone or in combination of two or more.

The total content of the conductive agent contained in the elastic layer is preferably determined in accordance with the volume resistivity of the elastic layer.

When the electron conductive agent is used as the conductive agent, the total amount of the electron conductive agent may be, for example, 1 part by mass or more and 20 parts by mass or less or 3 parts by mass or more and 20 parts by mass or less relative to 100 parts by mass of the elastic material.

When the ion conductive agent is used as the conductive agent, the total amount of the ion conductive agent may be, for example, 0.1 parts by mass or more and 10 parts by mass or less or 0.5 parts by mass or more and 5 parts by mass or less relative to 100 parts by mass of the elastic material.

The average primary particle diameter of the conductive agent is preferably 1 nm or more and 500 nm or less and more preferably 5 nm or more and 200 nm or less. The average primary particle diameter of the conductive agent is determined by measuring the long diameters of 100 conductive agent particles in a section of the elastic layer using an electron microscope, and then arithmetically averaging the measurement values.

The conductive agent is preferably carbon black. The average primary particle diameter of carbon black is preferably 1 nm or more and 500 nm or less and more preferably 5 nm or more and 200 nm or less.

The content of carbon black is preferably 1 part by mass or more and 20 parts by mass or less and more preferably 3 parts by mass or more and 10 parts by mass or less relative to 100 parts by mass of the elastic material.

Examples of other additives include a vulcanizing agent, a vulcanization accelerator, a vulcanization accelerating aid, a filler, a softener, a plasticizer, a curing agent, an antioxidant, a surfactant, a coupling agent, and the like.

Examples of the filler include calcium carbonate, silica, clay minerals, and the like. The fillers may be used alone or in combination of two or more.

The filler is preferably calcium carbonate. The content of calcium carbonate is preferably 1 part by mass or more and 50 parts by mass or less and more preferably 10 parts by mass or more and 40 parts by mass or less relative to 100 parts by mass of the elastic material.

The thickness of the elastic layer is preferably 1 mm or more and 10 mm or less and more preferably 2 mm or more and 5 mm or less.

The thickness of the elastic layer is measured by photographing a section using an electron microscope. The thickness at the center in the axial direction of the charging member is measured at 4 positions at intervals of 90° in the circumferential direction, and the arithmetic average value thereof is considered as the thickness of the elastic layer.

Examples of a method for forming the elastic layer on the support member include a method of extruding both a composition for forming an elastic layer, which is prepared by mixing an elastic material, a conductive agent, and other additives, and a cylindrical support member from an extrusion molding machine to form a composition layer for forming an elastic layer on the outer peripheral surface of the support member, and then performing crosslinking reaction (including vulcanization) by heating the composition layer for forming an elastic layer to form an elastic layer; a method of extruding a composition for forming an elastic layer, which is prepared by mixing an elastic material, a conductive agent, and other additives, from an extrusion molding machine to form a composition layer for forming an elastic layer on the outer peripheral surface of a support member, and then performing crosslinking reaction (including vulcanization) by heating the composition layer for forming an elastic layer to form an elastic layer; and the like. The support member may have an adhesive layer on the outer peripheral surface thereof.

[Adhesive Layer]

An adhesive layer may be disposed between the support member and the elastic layer in order to adhere both to each other.

Examples of the adhesive layer interposed between the support member and the elastic layer include layers containing resins such as a polyolefin resin, an acrylic resin, an epoxy resin, polyurethane, nitrile rubber, chlorine rubber, a vinyl chloride resin, a vinyl acetate resin, a polyester resin, a phenol resin, a silicone resin, and the like. The adhesive layer may contain a conductive agent (for example, the electron conductive agent or ion conductive agent described above).

From the viewpoint of adhesion between the elastic layer and the support member, the thickness of the adhesive layer is preferably 1 μm or more and 50 μm or less, more preferably 2 μm or more and 40 μm or less, and still more preferably 5 μm or more and 20 μm or less.

The thickness of the adhesive layer is measured by photographing a section using an electron microscope. The thickness is measured at 4 positions at intervals of 90° in the circumferential direction at the center in the axial direction of the charging member, and the arithmetic average value is considered as the thickness of the adhesive layer.

[Outer Layer]

The outer layer preferably has conductivity and a volume resistivity of $1\times10^{3}$ Ωcm or more and $1\times10^{14}$ Ωcm or less at a temperature of 20° C. The volume resistivity of the outer layer is a value measured by the same method as for the volume resistivity of the elastic layer.

In an exemplary embodiment of the present disclosure, the outer layer contains a resin, a conductive agent, and other additives.

Examples of the resin contained in the outer layer include a copolymer nylon resin, a polyamide resin, a polyimide resin, a polyamide-imide resin, a polyester resin, a polyethylene terephthalate resin, a polyarylate resin, a polycarbonate resin, a polyethylene resin, a polyurethane resin, a phenol resin, a silicone resin, an acrylic resin, a fluorine-modified acrylic resin, a silicone-modified acrylic resin, a melamine resin, an epoxy resin, a fluorine resin, a polyvinylidene fluoride resin, a tetrafluoroethylene resin, a polyvinyl butyral resin, an ethylene-tetrafluoroethylene copolymer resin, a tetrafluoroethylene-perfluoroalkyl vinyl ether copolymer resin, a tetrafluoroethylene-hexafluoropropylene copolymer resin, a fluororubber resin, a polyvinyl resin, a polyvinyl alcohol resin, a polyvinyl acetal resin, a polyvinylidene chloride resin, a polyvinyl chloride resin, an ethylene-vinyl acetate copolymer resin, cellulose, a polythiophene resin, a resin mixture of two or more of these resins, a resin produced by curing or crosslinking at least one of these resins with a curing agent or a catalyst, and the like. These resins may be used alone or in combination of two or more.

From the viewpoint of suppressing contamination of the outer layer, a polyamide resin, a polyvinylidene fluoride resin, and a tetrafluoroethylene resin are preferred, and polyamide is more preferred. From the viewpoint of suppressing contamination of the outer layer, alcohol-soluble polyamide is preferred, alkoxymethylated polyamide (alkoxymethylated nylon) is more preferred, and methoxymethylated polyamide (methoxymethylated nylon) is still more preferred.

The conductive agent contained in the outer layer is preferably conductive particles having a volume resistivity of $1\times10^{9}$ Ωcm or less. Examples of conductive particles include particles of metal oxides such as tin oxide, titanium oxide, zinc oxide, and the like; carbon black; and the like.

From the viewpoint of excellent dispersibility in a resin, the conductive particles contained in the outer layer preferably have a primary particle diameter 10 nm or more and 50 nm or less.

The content of the conductive particles in the outer layer is preferably 5 parts by mass or more and 50 parts by mass or less and more preferably 10 parts by mass or more and 30 parts by mass or less relative to 100 parts by mass of the resin.

The outer layer may contain particles for forming unevenness for the purpose of having fine unevenness on the surface thereof. The particles for forming unevenness may be inorganic particles or organic particles.

Examples of the particles for forming unevenness include inorganic particles such as silica particles, alumina particles, zircon particles, and the like; and resin particles such as polyamide resin particles, fluororesin particles, silicone resin particles, and the like. From the viewpoint of decreasing contamination of the charging member, the resin particles are preferred, and polyamide particles are more preferred. The types of the particles for forming unevenness may be used alone or in combination of two or more.

The volume-average particle diameter of the particles for forming unevenness is preferably 5 μm or more and 20 μm or less and more preferably 5 μm or more and 10 μm or less. The volume-average particle diameter of the particles for forming unevenness is determined by measuring long diameters of 100 particles by observation of a section of the outer layer with an electron microscope and then forming a volume-based particle size distribution assuming that the particles are spherical. The volume-based particle diameter is a cumulative particle diameter at 50% from the smaller diameter side.

When the outer layer contains the particles for forming unevenness, the content of the particles for forming unevenness is preferably 5 parts by mass or more and 30 parts by mass or less and more preferably 8 parts by mass or more and 20 parts by mass or less relative to 100 parts by mass of the resin.

The outer layer preferably contains 5 parts by mass or more and 30 parts by mass or less of the particles for forming unevenness having a volume-average particles diameter of 5 μm or more and 20 μm or less relative to 100 parts by mass of the resin, and more preferably contains 8 parts by mass or more and 20 parts by mass or less of the particles for forming unevenness having a volume-average particles diameter of 5 μm or more and 10 μm or less relative to 100 parts by mass of the resin.

Example of other additives include a vulcanizing agent, a vulcanization accelerator, a vulcanization accelerating aid, a filler, a softener, a plasticizer, a curing agent, an antioxidant, a surfactant, a coupling agent, and the like.

The thickness of the outer layer is preferably 1 μm or more and 25 μm or less, more preferably 2 μm or more and 20 μm or less, and still more preferably 3 μm or more and 15 μm or less.

The thickness of the outer layer is measured by photographing a section using an electron microscope. The thickness is measured at 4 positions at intervals of 90° in the circumferential direction at the center in the axial direction of the charging member, and an arithmetic average value is considered as the thickness of the outer layer.

A method for forming the outer layer on the elastic layer is, for example, a method of coating a composition for forming an outer layer, which is prepared by mixing a resin, a conductive agent, particles for forming unevenness, and other additives, on the outer peripheral surface of the elastic layer to form a composition layer for forming an outer layer, and then drying the composition layer for forming an outer layer. Examples of the method for coating the composition for forming an outer layer on the outer peripheral surface of the elastic layer include dip coating, roll coating, blade coating, wire bar coating, spray coating, beads coating, air knife coating, curtain coating, and the like.

[Protective Layer]

The protective layer is a layer containing silica (silicon dioxide, $SiO_2$).

The protective layer may contain a compound other than silica. Examples of the compound other than silica include resins such as a polyester resin, a styrene acrylic resin, and the like; waxes; inorganic particles such as titania ($TiO_2$), alumina ($Al_2O_3$), and the like; higher fatty acid metal salts; components produced by modifying these compounds; and the like.

From the viewpoint of suppressing the accumulation of contamination composed of a toner as a principal component and from the viewpoint of suppressing deterioration in the resin of the outer layer caused by discharge and suppressing the occurrence of cracks in the outer layer, the content of silica in the protective layer is preferably 25% by mass or more, more preferably 35% by mass or more, and still more preferably 45% by mass or more.

The content of silica in the protective layer may be 100% by mass, 85% by mass or less, or 70% by mass or less.

From viewpoint of protecting the outer layer, the thickness of the protective layer is preferably 1 μm or more, more preferably 2 μm or more, and still more preferably 4 μm or more.

From viewpoint of securing the charging performance of the charging member, the thickness of the protective layer is preferably 10 μm or less, more preferably 8 μm or less, and still more preferably 6 μm or less.

The thickness of the outer layer is measured by photographing a section using an electron microscope. The thickness is measured at 4 positions at intervals of 90° in the circumferential direction at the center in the axial direction of the charging member, and an arithmetic average value is considered as the thickness of the protective layer.

A method for forming the protective layer is not particularly limited. The method for forming the protective layer is, for example, a method of sequentially performing the formation of a silica-containing layer and surface treatment described below.

<Method for Producing Charging Member>

A method for producing the charging member according to an exemplary embodiment of the present disclosure is, for example, an exemplary embodiment below.

An example of the method for forming the charging member according the exemplary embodiment includes preparing a member having a support member, an elastic layer, an outer layer, and a layer containing silica in this order, and bringing alkali electrolysis water into contact with the layer containing silica to impart hydroxyl groups to the surface of the layer containing silica, forming a protective layer (surface treatment).

The "layer containing silica" is also referred to as the "silica-containing layer" hereinafter.

In an example of the exemplary embodiment, the member having the support member, the elastic layer, the outer layer, and the silica-containing layer in this order is prepared by separating a charging member from an image forming apparatus after use. When the member having the support member, the elastic layer, and the outer layer in this order is continuously used as a charging member, a toner is transferred from a photoreceptor onto the outer layer of the charging member, and the silica-containing layer containing a component derived from silica particles used as a toner external additive is formed on the outer layer.

When the charging member separated from the image forming apparatus after use is subjected to surface treatment using alkali electrolysis water, the charging member can be reproduced. In this case, the charging member is a so-called reproduced charging member.

In an example of the exemplary embodiment, the member having the support member, the elastic layer, the outer layer, and the silica-containing layer in this order is prepared by forming the silica-containing layer on the outer layer of the member having the support member, the elastic layer, and the outer layer in this order (formation of the silica-containing layer).

[Formation of Silica-Containing Layer]

The member having the support member, the elastic layer, and the outer layer in this order is obtained by forming the elastic layer on the support member and then forming the outer layer on the elastic layer. Examples of a method for forming the elastic layer on the support member and a method for forming the outer layer on the elastic layer are as described above. The support member and the elastic layer may be adhered to each other with an adhesive layer.

In forming the silica-containing layer, the silica-containing layer (an original film of the protective layer) is formed on the outer layer of the member. The silica-containing layer is formed so that the silica element concentration of the silica-containing layer is 10 atomic % or more.

Examples of a method for forming the silica-containing layer include known film forming methods, using silica (silicon dioxide, $SiO_2$) as a material, such as plasma CVD (Chemical Vapor Deposition), vacuum vapor deposition, sputtering, ion plating, and the like.

Another example of the method for forming the silica-containing layer includes mounting a member having a support member, an elastic layer, and an outer layer in this order in a charging member mounting part in an electrophotographic image forming apparatus, and then operating the image forming apparatus to form an image using a toner containing silica particles externally added thereto. That is, in this example, an image is formed by using the member described above as the charging member. In this method, the toner is transferred from the photoreceptor to the outer layer of the member, and the silica-containing layer containing a component derived from the silica particles used as a toner external additive is formed on the outer layer.

The image forming apparatus used in the method described above may be a system in which the charging member is not in contact with the photoreceptor (the charging member electrostatically attracts the toner), but a system in which the charging member is in contact with the photoreceptor is efficient.

The method allows the silicon element concentration of the silica-containing layer to be adjusted according to the amount of image formation. There is a tendency that the more the amount of image formation is, the higher the silicon element concentration of the silica-containing layer is.

The toner used in the method described above may contain silica particles external added thereto, and toner base particles and other external additives are not limited. The toner base particles contain, for example, a binder resin such as a polyester resin, a styrene acrylic resin, or the like, and a release agent (various waxes). The toner base particles may contain a colorant or may not contain a colorant. Examples of other external additives include inorganic particles such as titania ($TiO_2$), alumina ($Al_2O_3$), and the like; a cleaning activator (for example, a higher fatty acid metal salt represented by zinc stearate); and the like.

[Surface Treatment]

In surface treatment, the alkali electrolysis water is brought into contact with the silica-containing layer to impart hydroxyl groups to the surface of the silica-containing layer, thereby forming the protective layer. The surface treatment is performed so that the contact angle with water of the surface of the protective layer (that is, the outer peripheral surface of the charging member) is 35 degrees or less.

The alkali electrolysis water is water produced by electrolyzing water. When the alkali electrolysis water is brought into contact with the silica-containing layer, hydroxyl groups (—OH) are imparted to the surface of the silica-containing layer, and thus the contact angle with water of the surface is decreased.

Examples of a method for bringing the silica-containing layer into contact with the alkali electrolysis water include dip coating, spray coating, and the like. After the alkali electrolysis water is brought into contact with the silica-containing layer, the layer is preferably dried at room temperature.

The contact angle with water of the surface of the protective layer (that is, the outer peripheral surface of the charging member) can be adjusted by pH of the alkali electrolysis water and the time of contact of the silica-containing layer with the alkali electrolysis water.

The pH of the alkali electrolysis water is preferably pH 10 or more and more preferably pH 11 or more in view of the effect of imparting hydroxyl groups.

The pH of the alkali electrolysis water is preferably pH 12 or less from the viewpoint of not causing corrosion of the support member and denaturation of the outer layer and the elastic layer.

The time of contact of the silica-containing layer with the alkali electrolysis water is preferably adjusted according to the pH of the alkali electrolysis water. When the alkali electrolysis water is pH 12, the contact time is preferably 30 seconds or more and 30 minutes or less.

<Charging Device, Image Forming Apparatus, and Process Cartridge>

A charging device according to an exemplary embodiment of the present disclosure includes the charging member according to the exemplary embodiment. The charging device according to the exemplary embodiment may be a charging device of a system in which the charging member is in contact with the surface of the photoreceptor, or a charging device of a system in which the charging member is not in contact with the surface of the photoreceptor. In the charging device of a system in which the charging member is in contact with the surface of the photoreceptor, the effect exhibited by the exemplary embodiment (the surface of the charging member is hardly contaminated, and a crack hardly occurs in the outer layer) is remarkable.

An image forming apparatus according to an exemplary embodiment of the present disclosure includes a photoreceptor, a charging device which charges the surface of the photoreceptor, an electrostatic latent image forming device which forms an electrostatic latent image on the charged surface of the photoreceptor, a developing device which develops the electrostatic latent image formed on the surface of the photoreceptor with a developer containing a toner to form a toner image, and a transfer device which transfers the toner image to the surface of a recording medium. A charging device having the charging member according to the exemplary embodiment is applied as the charging device. The charging device may be a charging device of a system in which the charging member is in contact with the surface of the photoreceptor, or a charging device of a system in which the charging member is not in contact with the surface of the photoreceptor. In the charging device of a system in which the charging member is in contact with the surface of the photoreceptor, the effect exhibited by the exemplary embodiment (the surface of the charging member is hardly contaminated, and crack hardly occurs in the outer layer) is remarkable.

In the image forming apparatus according to the exemplary embodiment, for example, a portion including the photoreceptor and the charging device may have a cartridge structure (that is, a process cartridge according to an exemplary embodiment) detachable from the image forming apparatus. The process cartridge may include, other than the photoreceptor and the charging device, for example, at least one selected from the group including the electrostatic latent image forming device, the developing device, and the transfer device. The charging device may be a charging device of a system in which the charging member is in contact with the surface of the photoreceptor, or a charging device of a system in which the charging member is not in contact with the surface of the photoreceptor. In the charging device of a system in which the charging member is in contact with the surface of the photoreceptor, the effect exhibited by the exemplary embodiment (the surface of the charging member is hardly contaminated, and crack hardly occurs in the outer layer) is remarkable.

Examples of an apparatus applied to the image forming apparatus according to the exemplary embodiment include well-known image forming apparatuses such as an apparatus provided with a fixing device which fixes a toner image transferred to the surface of a recording medium; an apparatus of a direct transfer system in which a toner image formed on the surface of a photoreceptor is transferred directly to a recording medium; an apparatus of an intermediate transfer system in which a toner image formed on the surface of a photoreceptor is first transferred to the surface of an intermediate transfer body, and then the toner image transferred to the surface of the intermediate transfer body is second transferred to the surface of a recording medium; an apparatus provided with a cleaning device which cleans the surface of the photoreceptor after transfer of the toner image and before charging; an apparatus provided with a static elimination device which eliminates electricity by irradiating elimination light to the surface of the photoreceptor after transfer of the toner image and before charging; an apparatus provided with a photoreceptor heating member which increases the temperature of the photoreceptor and decreases relative humidity; and the like.

In the apparatus of an intermediate transfer system, an example of a configuration applied to the transfer device includes an intermediate transfer body to the surface of which a toner image is transferred, a first transfer device which first transfers the toner image formed on the surface of the photoreceptor to the surface of the intermediate transfer body, and a second transfer device which second transfers the toner image transferred to the surface of the intermediate transfer body to the surface of a recording medium.

The image forming apparatus according to the exemplary embodiment may be any one of an image forming apparatus of a dry development system and an image forming apparatus of a wet development system (development system using a liquid developer).

An example of the image forming apparatus according to the exemplary embodiment is described below, but the image forming apparatus is not limited to this. A principal portion shown in the drawings is described, and description of other portions is omitted.

Figure 3:
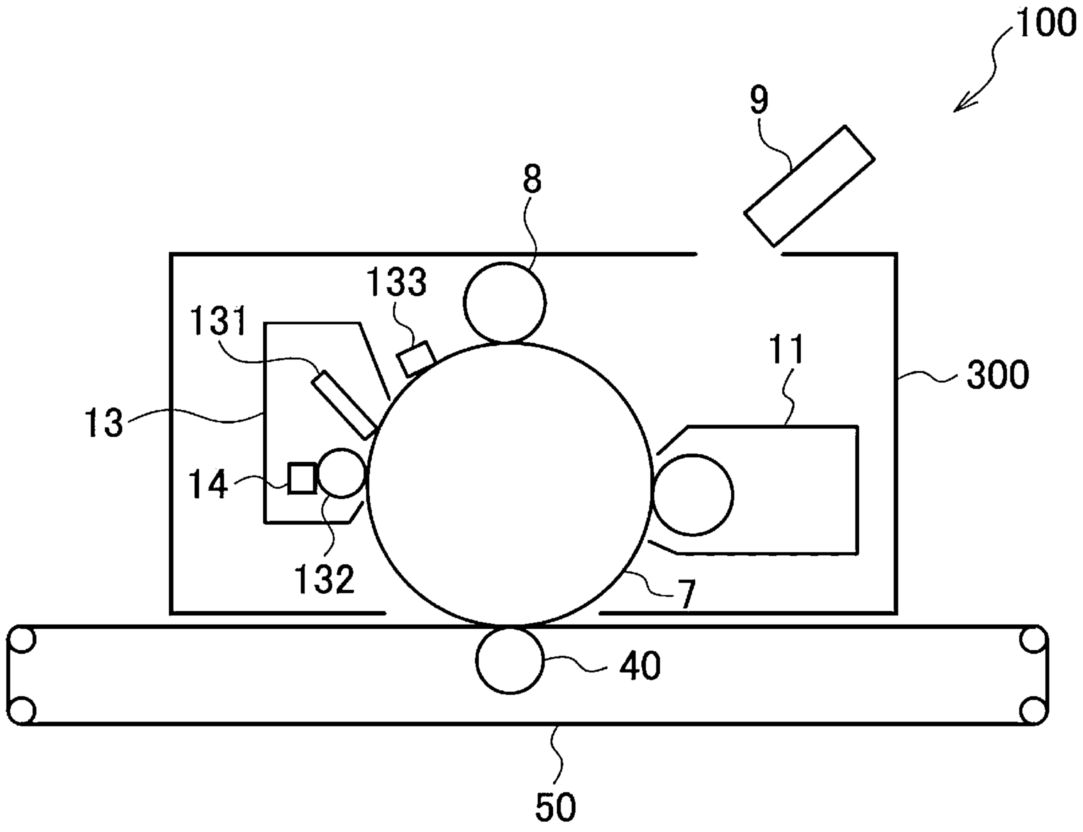
FIG. 3 is a schematic configuration diagram showing an example of an image forming apparats according to an exemplary embodiment of the present disclosure.

FIG. 3 is a schematic configuration diagram showing an example of the image forming apparatus according to the exemplary embodiment.

As shown in FIG. 3, an image forming apparatus 100 according to the exemplary embodiment includes a process cartridge 300, an exposure device 9 (an example of the electrostatic latent image forming device), a transfer device 40 (first transfer device), and an intermediate transfer body 50. In the image forming apparatus 100, the exposure device 9 is disposed at a position where a photoreceptor 7 can be exposed to light from an opening of the process cartridge 300, the transfer device 40 is disposed at a position facing the photoreceptor 7 through the intermediate transfer body 50, and the intermediate transfer body 50 is disposed to be partially in contact with the photoreceptor 7. Although not shown in the drawing, a second transfer device which transfers the toner image transferred to the intermediate transfer body 50 to a recording medium (for example, paper) is also provided. The intermediate transfer 50, the transfer device 40 (first transfer device), and the second transfer device (not shown) corresponds to an example of the transfer device.

The process cartridge 300 shown in FIG. 3 includes the photoreceptor 7, a charging device 8, a developing device 11, and a cleaning device 13 which are integrally supported in a housing. The cleaning device 13 includes a cleaning blade (an example of the cleaning member) 131, and the cleaning blade 131 is disposed so as to be in contact with the surface of the photoreceptor 7. The cleaning member is not a form of the cleaning blade 131, and a conductive or insulating fibrous member may be used, and this may be used singly or used in combination with the cleaning blade 131.

FIG. 3 shows an example of the image forming apparatus which is provided with a fibrous member 132 (roll shape) which supplies a lubricant 14 to the surface of the photoreceptor 7 and a fibrous member 133 (flat brush shape) which supports cleaning, and these are disposed according to demand.

Each of the components of the image forming apparatus according to the exemplary embodiment is described below.

—Photoreceptor—

For example, the photoreceptor 7 has a structure in which an undercoat layer and a photosensitive layer are laminated in this order on a conductive substrate. The photosensitive layer may be a single-layer photosensitive layer or a laminated photosensitive layer including a charge generating layer and a charge transporting layer.

—Charging Device—

The charging device 8 includes the charging member according to the exemplary embodiment. The charging device 8 may be a charging device of a system in which the charging member is in contact with the surface of the photoreceptor or a charging device of a system in which the charging member is not in contact with the surface of the photoreceptor. The charging device may be any one of a charging device of a system (DC charging system) in which only a direct current voltage is applied to the charging member, a charging device of a system (AC charging system) in which only an alternating current voltage is applied to the charging member, and a charging device of a system (AC/DC charging system) in which a voltage, which is an alternating current voltage superimposed on a direct current voltage, is applied to the charging member.

—Exposure Device—

The exposure device 9 is, for example, an optical device in which the surface of the photoreceptor 7 is exposed in a predetermined image pattern to light such as semiconductor laser light, LED light, liquid crystal shutter light, or the like. The wavelength of a light source is within the spectral sensitivity range of the photoreceptor. The mainstream of the wavelength of semiconductor laser is near-infrared light having an oscillation wavelength near 780 nm. However, the wavelength is not limited to this, and a laser having an oscillation wavelength on the order of 600 nm or a laser as a blue laser having an oscillation wavelength of 400 nm or more and 450 nm or less may be used. Also, a surface light-emitting laser light source of a type which can output multibeam for forming a color image is effective.

—Developing Device—

The developing device 11 is, for example, a general developing device which develops with a developer in a contact or non-contact manner. The developing device 11 is not particularly limited as long as it has the function described above and is selected according to purposes. Examples thereof include a well-known developing device having the function of adhering a one-component developer or a two-component developer to the photoreceptor 7 by using a brush, a roller, or the like. In particular, a developing roller maintaining a developer in the surface thereof is preferred.

The developer used in the developing device 11 may be a one-component developer containing only a toner or a two-component developer containing a toner and a carrier. Also, the developer may be either magnetic or nonmagnetic. A known developer is used as these developers.

—Cleaning Device—

A device of a cleaning blade system provided with the cleaning blade 131 is used as the cleaning device 13. Besides the cleaning blade system, a fur brush cleaning system and a simultaneous development-cleaning system may be used.

—Transfer Device—

Examples of the transfer device 40 include a contact-type transfer charger using a belt, a roller, a film, a rubber blade, or the like; and themselves well-known transfer chargers such as scorotron transfer charger and corotron transfer charger using corona discharge, and the like.

—Intermediate Transfer Body—

A belt shape (intermediate transfer belt) containing polyimide, polyamide-imide, polycarbonate, polyarylate, polyester, rubber, or the like, which is imparted with semiconductivity, is used as the intermediate transfer body 50.

Besides the belt shape, a drum shape may be used as the form of the intermediate transfer body.

Figure 4:
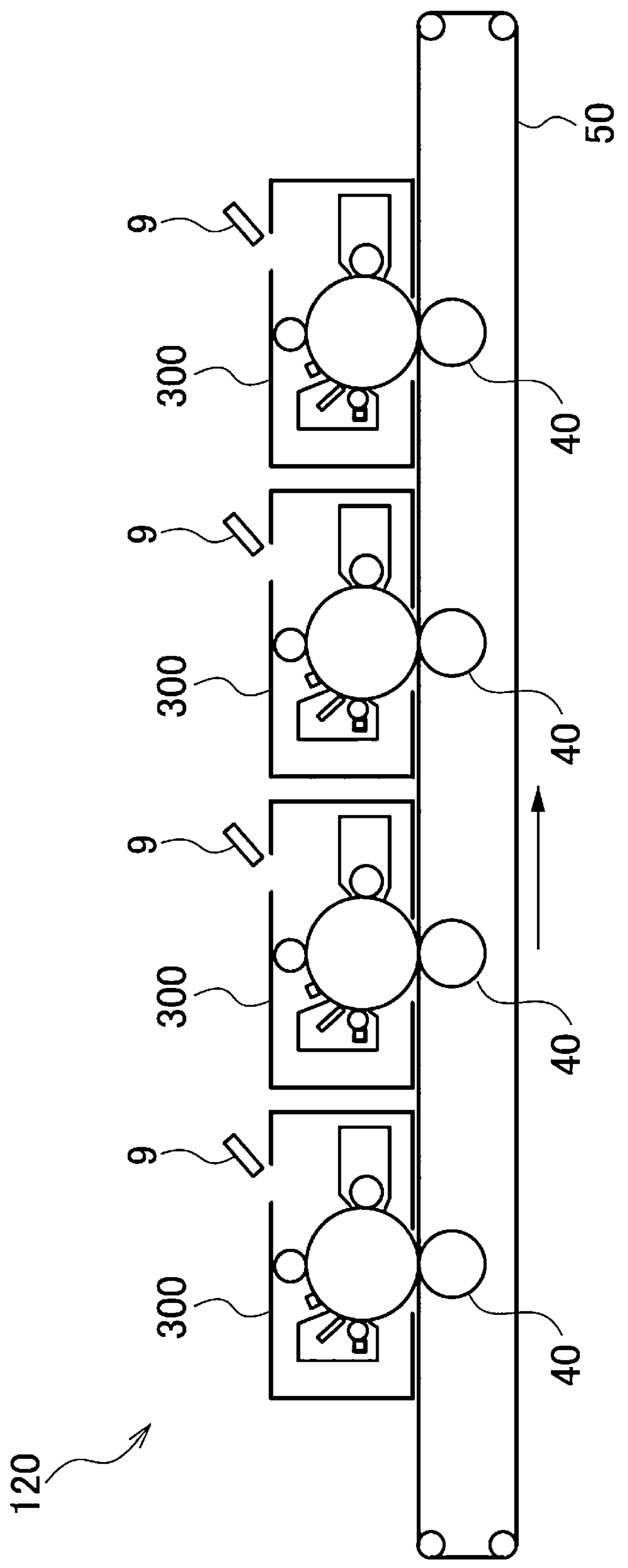
FIG. 4 is a schematic configuration diagram showing another example of an image forming apparats according to an exemplary embodiment of the present disclosure.

FIG. 4 is a schematic configuration diagram showing another example of the image forming apparatus according to the exemplary embodiment.

An image forming apparatus 120 shown in FIG. 4 is a multicolor image forming apparatus of a tandem type mounted with four process cartridges 300. The image forming apparatus 120 has a configuration in which the four process cartridges 300 are disposed in parallel on the intermediate transfer body 50 and one photoreceptor is used for each color. The image forming apparatus 120 has the same configuration as the image forming apparatus 100 except that a tandem system is used.

EXAMPLES

An exemplary embodiment of the present disclosure is described in detail below by using examples, but the exemplary embodiment of the present disclosure is not limited to these examples.

In description below, "parts" and "%" are on a mass basis unless otherwise specified.

In description below, synthesis, production, treatment, and measurement are performed at room temperature (25° C.±3° C.).

<Production of Charging Roller>

Example 1

—Preparation of Support Member—

A cylindrical member made of SUM23L is subjected to electroless nickel plating with a thickness of 5 μm and further plated with hexavalent chromic acid, preparing a support member having a diameter of 8 mm.

—Formation of Adhesive Layer—

Chlorinated polypropylene resin (maleic anhydride chlorinated polypropylene resin, Superchlon 930, Nippon Paper Industries Co., Ltd.): 100 parts Epoxy resin (EP4000, ADEKA Corporation): 10 parts Conductive agent: carbon black (Ketjen black EC, Ketjen Black International Company): 2.5 parts Toluene or xylene: proper amount The materials described above are mixed and treated for 1 hour by using a ball mill, producing a resin composition. The resultant resin composition is coated on the surface of the support member with a brush, forming an adhesive layer having a thickness of 10 μm.

Epichlorohydrin rubber (Hydrin T3106, Zeon Corporation): 100 parts

Electron conductive agent: carbon black (Asahi #60, Asahi Carbon Co., Ltd.): 6 parts Ion conductive agent (BTEAC, Lion Corporation): 5 parts Calcium carbonate (Whiton SB, Shiraishi Calcium Co., Ltd.): 20 parts Vulcanizing agent: sulfur (VULNOC R, Ouchi Shinko Chemical Industrial Co., Ltd.): 1 part Vulcanization accelerator: stearic acid (NOF Corporation): 1 part Vulcanization accelerator: zinc oxide: 1.5 parts The materials described above are mixed, kneaded by using a tangential pressure kneader, and passed through a strainer to form a rubber composition. The resultant rubber composition is kneaded by using an open roller and molded into a roll shape on the surface of the adhesive layer by using a molding machine. Next, the molded product is heated for 70 minutes by using a heating furnace at a temperature of 175° C., producing an elastic layer. The diameter up to the elastic layer is 12 mm.

—Formation of Outer Layer—

Binder resin: N-methoxymethylated nylon 1 (FR101, Namariichi Co., Ltd.): 100 parts Conductive agent: carbon black (volume average particle diameter 43 nm, MONAHRCH 1000, Cabot Corporation): 15 parts Unevenness forming particles: polyamide particles (volume average particle diameter 10 μm, Orgasol 2001 EXD Nat 1, Arkema Inc.): 12 parts The materials described above are mixed, diluted with methanol, and then dispersed at a number of propeller rotations of 2000 rpm for 60 minutes by using a beads mill and glass beads having a diameter of 1.3 mm. The resultant dispersion liquid is coated on the surface of the elastic layer by a blade coting method. Next, the product is heated for 30 minutes by using a heating furnace at a temperature of 150° C., forming an outer layer having a thickness of 10 μm.

—Formation of Protective Layer—

—Formation of Silica-Containing Layer—

A charging roller having the layers formed up to the outer layer is mounted in a drum cartridge of image forming apparatus Apeos C7070 of Fujifilm Business Innovation Corp. In this case, the cleaning roller of the charging roller is not mounted, and the charging roller is mounted. The developing device of the image forming apparatus is filled with a developer containing a toner containing silica particles externally added thereto. The image forming apparatus is a system in which the charging member is in contact with the photoreceptor.

A patch image having many patches scattered therein with a total image density of 5% is output on 5000 sheets of A4-size plain paper in an environment at a temperature of 10° C. and a relative humidity of 15%. In this image formation, a silica-containing layer is formed on the surface of the outer layer of the charging roller. The charging roller having the silica-containing layer is separated from the image forming apparatus.

Surface Treatment

The charging roller having the silica-containing layer is surface-treated by dipping in alkali electrolysis water at pH 12 for 30 minutes. The charging roller is taken out from the alkali electrolysis water and dried at room temperature for 24 hours, producing the charging roller having the protective layer.

The thickness of the protective layer, the silica content, the silicon electron concentration, and the contact angle with water of the outer peripheral surface are measured by the measurement methods described above.

Example 2

A charging roller is produced by the same method as in Example 1 except that the time of dipping in the alkali electrolysis water in surface treatment is changed to 3 minutes.

Example 3

A charging roller is produced by the same method as in Example 1 except that the time of dipping in the alkali electrolysis water in surface treatment is changed to 30 seconds.

Example 4

A charging roller is produced by the same method as in Example 1 except that in forming the silica-containing layer, the number of sheets of paper to which the patch image is output, is changed to 2000, and the time of dipping in the alkali electrolysis water in surface treatment is changed to 30 seconds.

Example 5

A charging roller is produced by the same method as in Example 1 except that in forming the silica-containing layer, the number of sheets of paper, to which the patch image is output, is changed to 10,000, and the time of dipping in the alkali electrolysis water in surface treatment is changed to 30 seconds.

Comparative Example 1

A charging roller is produced by the same method as in Example 1 except that the surface treatment is not performed.

Comparative Example 2

A charging roller is produced by the same method as in Example 1 except that in the surface treatment, the alkali electrolysis water is changed to ion exchange water.

Comparative Example 3

A charging roller is produced by the same method as in Example 1 except that in forming the silica-containing layer, the number of sheets of paper to which the patch image is output, is changed to 500, and the time of dipping in the alkali electrolysis water in surface treatment is changed to 30 seconds.

Comparative Example 4

A charging roller is produced by the same method as in Example 1 except that the silica-containing layer is not formed.

Example 6

A charging roller is produced by the same method as in Example 1 except that the formation of the silica-containing layer is changed to plasma CVD described below.

Formation of Silica-Containing Layer

A parallel plate-type plasma CVD apparatus is used. TEOS (tetraethoxysilane) used as a film formation raw material is heated to 60° C. and bubbled using He as a carrier gas, and then introduced into a chamber. The flow rate of TEOS is controlled by the pressure of a bubbler and the flow rate of the carrier gas, and $O_2$ as oxidation gas and He as dilution gas are introduced. Discharge is performed at a high frequency of 13.56 MHZ, and the film formation temperature of 200° C. and the reaction pressure of 1 Torr are set. The flow rate is adjusted so that the film formation rate is 100 nm/min, forming a silica-containing layer having a thickness of 5 μm.

<Performance Evaluation of Charging Member>

The charging roller of each of the examples is mounted on a drum cartridge of image forming apparatus Apeos C7070 of Fujifilm Business Innovation Corp. This image forming apparatus is a system in which the charging member is in contact with the photoreceptor.

[Contamination Resistance (1)]

A band-shaped image of 320 mm in length×30 mm in width with an image density of 100% is output on 100,000 sheets of A3-size plain paper in an environment at a temperature of 10° C. and a relative humidity of 15%.

A 1 μm-square region of the surface of the charging roller in contact with the band-shaped toner image of the photoreceptor is observed with a confocal laser scanning microscope (OLS1100, manufactured by OLYMPAS Corporation), and contamination resistance is classified as follows.

G0: An attached substance is observed on the surface of the charging roller, and the area ratio of the attached substance is 10% or less.

G0.5: An attached substance is observed on the surface of the charging roller, and the area ratio of the attached substance is over 10% and 20% or less.

G1: An attached substance is observed on the surface of the charging roller, and the area ratio of the attached substance is over 20% and 30% or less.

G2: An attached substance is observed on the surface of the charging roller, and the area ratio of the attached substance is over 30% and 40% or less.

G3: An attached substance is observed on the surface of the charging roller, and the area ratio of the attached substance is over 40% and 50% or less.

[Contamination Resistance (2)]

After evaluation of contamination resistance (1), the same image is further output on 100,000 sheets in the same environment. Then (that is, after output on a total of 200,000 sheets), the surface of the charging roller is observed by the same observation method as in evaluation of contamination resistance (1), and contamination resistance is classified as follows.

G0: An attached substance is observed on the surface of the charging roller, and the area ratio of the attached substance is 10% or less.

G0.5: An attached substance is observed on the surface of the charging roller, and the area ratio of the attached substance is over 10% and 20% or less.

G1: An attached substance is observed on the surface of the charging roller, and the area ratio of the attached substance is over 20% and 30% or less.

G2: An attached substance is observed on the surface of the charging roller, and the area ratio of the attached substance is over 30% and 40% or less.

G3: An attached substance is observed on the surface of the charging roller, and the area ratio of the attached substance is over 40% and 50% or less.

[Crack]

After evaluation of contamination resistance (2), the surface of the charging roller is observed by using a laser microscope (model VK) manufactured by Keyence Corporation with an objective lens magnification of 50 times. The number of cracks is counted over the entire region of 1 mm in width at either end in the axial direction of the outer peripheral surface and classified as described below. A crack of 5 μm or more in width and 50 μm or more in length is considered as a crack and counted as "1 crack".

G0: The number of cracks is 0.

G1: The number of cracks is 1 to 4.

G2: The number of cracks is 5 or more.

TABLE 1

| | Protective layer | | | Outer peripheral surface | Performance evaluation: Contamination resistance | | |
|---|---|---|---|---|---|---|---|
| | Thickness µm | $SiO_2$ content % by mass | Si concentration atomic % | Contact angle with water Degrees | (1) 100,000 sheets | (2) 200,000 sheets | Crack |
| Example 1 | 5 | 52 | 20 | 25 | G0 | G0 | G0 |
| Example 2 | 5 | 52 | 20 | 30 | G0 | G0.5 | G0 |
| Example 3 | 5 | 52 | 20 | 35 | G0.5 | G0.5 | G0 |
| Example 4 | 1 | 25 | 12 | 35 | G0.5 | G0.5 | G0 |
| Example 5 | 10 | 57 | 20 | 35 | G0.5 | G0.5 | G0 |
| Comparative Example 1 | 5 | 52 | 20 | 50 | G1 | G3 | G1 |
| Comparative Example 2 | 5 | 52 | 20 | 45 | G1 | G2 | G1 |
| Comparative Example 3 | 0.5 | 21 | 8 | 35 | G1 | G2 | G1 |
| Comparative Example 4 | 0 | 0 | 0 | 40 | G2 | G3 | G2 |
| Example 6 | 5 | 100 | 33 | 25 | G0 | G0 | G0 |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

The charging member, the method for producing a charging member, the charging device, the process cartridge, and the image forming apparatus of the present disclosure include the following aspects.

What is claimed is:

1. A charging member comprising:

a support member;

an elastic layer provided on the support member;

an outer layer provided on the elastic layer; and a protective layer provided as an outermost layer on the outer layer, wherein:

the protective layer contains silica and has a silicon element concentration of 20 atomic % or more and 33 atomic % or less; and the outer peripheral surface has a contact angle with water of 35 degrees or less.

2. The charging member according to claim 1, wherein the contact angle with water of the outer peripheral surface is 25 degrees or less.

3. The charging member according to claim 1, wherein the thickness of the protective layer is 1 µm or more and 10 µm or less.

4. A method for producing the charging member according to claim 1, the method comprising:

preparing a member having a support member, an elastic layer, an outer layer, and a layer containing silica in this order; and imparting hydroxyl groups to the surface of the layer containing silica by bringing alkali electrolysis water into contact with the layer containing silica, forming a protective layer.

5. A method for producing the charging member according to claim 2, the method comprising:

preparing a member having a support member, an elastic layer, an outer layer, and a layer containing silica in this order; and imparting hydroxyl groups to the surface of the layer containing silica by bringing alkali electrolysis water into contact with the layer containing silica, forming a protective layer.

6. A method for producing the charging member according to claim 3, the method comprising:

preparing a member having a support member, an elastic layer, an outer layer, and a layer containing silica in this order; and imparting hydroxyl groups to the surface of the layer containing silica by bringing alkali electrolysis water into contact with the layer containing silica, forming a protective layer.

7. A charging device comprising the charging member according to claim 1.

8. A charging device comprising the charging member according to claim 2.

9. A charging device comprising the charging member according to claim 3.

10. A process cartridge comprising:

a photoreceptor;

a charging device which includes the charging member according to claim 1 and is configured to charge the surface of the photoreceptor by contact with the charging member; and a cleaning device configured to clean the surface of the photoreceptor before charging, wherein the process cartridge is detachable from an image forming apparatus.

11. A process cartridge comprising:

a photoreceptor;

a charging device which includes the charging member according to claim 2 and is configured to charge the surface of the photoreceptor by contact with the charging member; and a cleaning device configured to clean the surface of the photoreceptor before charging, wherein the process cartridge is detachable from an image forming apparatus.

12. An image forming apparatus comprising:

a photoreceptor;

a charging device which includes the charging member according to claim 1 and is configured to charge the surface of the photoreceptor by contact with the charging member;

an electrostatic latent image forming device configured to form an electrostatic latent image on the charged surface of the photoreceptor;

a developing device configured to develop the electrostatic latent image formed on the surface of the photoreceptor with a developer containing a toner to form a toner image; and a transfer device configured to transfer the toner image to the surface of a recording medium.

* * * * *